United States Patent
Kong et al.

(10) Patent No.: US 11,266,913 B2
(45) Date of Patent: Mar. 8, 2022

(54) METHOD AND APPARATUS FOR SYNCHRONOUSLY DISPLAYING GAME CONTENT AND STORAGE MEDIUM

(71) Applicant: Tencent Technology (Shenzhen) Company Limited, Shenzhen (CN)

(72) Inventors: Ronghua Kong, Shenzhen (CN); Changsong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 169 days.

(21) Appl. No.: 16/749,877

(22) Filed: Jan. 22, 2020

(65) Prior Publication Data
US 2020/0155946 A1 May 21, 2020

Related U.S. Application Data

(63) Continuation of application No. PCT/CN2018/096805, filed on Jul. 24, 2018.

(30) Foreign Application Priority Data

Jul. 24, 2017 (CN) .......................... 201710610002.6

(51) Int. Cl.
*A63F 13/77* (2014.01)
*A63F 13/35* (2014.01)
(Continued)

(52) U.S. Cl.
CPC .............. *A63F 13/77* (2014.09); *A63F 13/35* (2014.09); *G06F 3/1454* (2013.01); *G06F 9/52* (2013.01);
(Continued)

(58) Field of Classification Search
CPC ...... A63F 13/537; A63F 13/497; A63F 13/25; G07F 17/3276; H04L 67/02
See application file for complete search history.

(56) References Cited

U.S. PATENT DOCUMENTS

2006/0236247 A1 * 10/2006 Morita ................ H04L 12/1822
715/733
2008/0126568 A1 5/2008 Otoshi et al.
(Continued)

FOREIGN PATENT DOCUMENTS

CN 1743043 A 3/2006
CN 1945587 A 4/2007
(Continued)

OTHER PUBLICATIONS

Tencent Technology, ISRWO, PCT/CN2018/096805, Oct. 18, 2018, 8 pages.
(Continued)

*Primary Examiner* — Mahran Y Abu Roumi
(74) *Attorney, Agent, or Firm* — Morgan, Lewis & Bockius LLP

(57) ABSTRACT

The present application discloses a method for synchronously displaying game content at a terminal device. The method includes: detecting a first operation instruction on a first client of a game application when a round of the game application is run on the first client, accounts participating in the round of game including a first account and a second account, and determining, a first operation that corresponds to the first operation instruction and is performed by a first operation object corresponding to the first account in the round of game; determining first content that needs to be displayed on the first client when the first operation object performs the first operation, and obtaining second content to be simultaneously displayed with the first content, the second content being content that needs to be displayed on the
(Continued)

second client; and simultaneously displaying the first content and the second content on the first client.

20 Claims, 5 Drawing Sheets

(51) Int. Cl.
*G06F 3/14* (2006.01)
*G06F 9/52* (2006.01)
*G06F 9/54* (2006.01)
*H04L 29/08* (2006.01)
*H04L 29/06* (2006.01)
*H04L 67/306* (2022.01)
*H04L 67/131* (2022.01)
*H04L 69/16* (2022.01)

(52) U.S. Cl.
CPC ............ *G06F 9/546* (2013.01); *H04L 67/306* (2013.01); *H04L 67/38* (2013.01); *H04L 69/16* (2013.01)

(56) References Cited

U.S. PATENT DOCUMENTS

| | | | | |
|---|---|---|---|---|
| 2010/0041481 | A1* | 2/2010 | Smedley | A63F 13/12 463/42 |
| 2011/0143835 | A1* | 6/2011 | Sizelove | B64D 11/00155 463/31 |
| 2013/0324239 | A1* | 12/2013 | Ur | G06F 30/20 463/31 |
| 2014/0038781 | A1* | 2/2014 | Foley | A63B 21/015 482/9 |
| 2014/0135129 | A1* | 5/2014 | Hussman | A63F 13/235 463/31 |
| 2014/0282086 | A1* | 9/2014 | Shi | H04N 21/4316 715/752 |
| 2015/0222239 | A1* | 8/2015 | Zhang | A63F 13/25 381/61 |
| 2016/0080457 | A1* | 3/2016 | Perry | H04L 67/38 709/219 |
| 2016/0094869 | A1* | 3/2016 | Cao | H04N 21/4622 725/109 |
| 2017/0036106 | A1* | 2/2017 | Stechschulte | A63F 13/533 |
| 2020/0206622 | A1* | 7/2020 | Noguchi | A63F 13/537 |

FOREIGN PATENT DOCUMENTS

| | | |
|---|---|---|
| CN | 102968549 A | 3/2013 |
| CN | 104007946 A | 8/2014 |
| CN | 105511778 A | 4/2016 |
| CN | 106303743 A | 1/2017 |
| CN | 107423015 A | 12/2017 |
| JP | 2007307303 A | 11/2007 |
| JP | 6159458 B1 | 7/2017 |
| KR | 20030055165 A | 7/2003 |
| KR | 20060083051 A | 7/2006 |
| WO | WO 2013138529 A1 | 9/2013 |

OTHER PUBLICATIONS

Tencent Technology, IPRP, PCT/CN2018/096805, Jan. 28, 2020, 6 pages.
XboxPlayStation, FAQ / Frequently Asked Questions, World Web Archive—National Diet Library Internet Material, Collection and Preservation Industry, Nov. 27, 2016, 7 pgs., Retrieved from the Internet: https://xn--playstation-uv6w805m.jp/darksouls3/darksouls3-faq.html.

* cited by examiner

METHOD AND APPARATUS FOR SYNCHRONOUSLY DISPLAYING GAME CONTENT AND STORAGE MEDIUM

CROSS-REFERENCE TO RELATED APPLICATIONS

This application is a continuation application of PCT/CN2018/096805, entitled "METHOD AND APPARATUS FOR SYNCHRONOUSLY DISPLAYING GAME CONTENT AND STORAGE MEDIUM" filed on Jul. 24, 2018, which claims priority to Chinese Patent Application No. 201710610002.6, filed with the Chinese Patent Office on Monday, Jul. 24, 2017 and entitled "METHOD AND APPARATUS FOR SYNCHRONOUSLY DISPLAYING GAME CONTENT", both of which are incorporated by reference in their entirety.

FIELD OF THE TECHNOLOGY

The present application relates to the field of Internet, and specifically, to a method and an apparatus for synchronously displaying game content and a storage medium.

BACKGROUND OF THE DISCLOSURE

People are faced with more and more choices of entertainment with the development of multimedia technology and the popularization of wireless networks. For example, people play games online with handheld media devices. There are various types of games such as bullet hell games, adventure games, simulation games, role-playing games, casual games.

Most types of games can be played online by a number of players at the same time. However, bullet hell games are standalone games and cannot be played online by a number of players.

SUMMARY

Embodiments of the present application provide a method and an apparatus for synchronously displaying game content and a storage medium.

According to an aspect of the embodiments of the present application, a method for synchronously displaying game content is provided, applied to a terminal device having one or more processors and memory storing a plurality of programs to be executed by the one or more processors, and including:

detecting a first operation instruction on a first client of a game application in a case that a round of game of the game application is run on the first client, a first account being logged into on the first client, accounts participating in the round of game including the first account and a second account, and the second account being configured for login on a second client of the game application; determining, according to the first operation instruction, a first operation that corresponds to the first operation instruction and is performed by a first operation object corresponding to the first account in the round of game; determining first content that needs to be displayed on the first client in a case that the first operation object performs the first operation, and obtaining second content to be simultaneously displayed with the first content, the second content being content that needs to be displayed on the second client in a case that a second operation object corresponding to the second account in the round of game performs a second operation; and simultaneously displaying the first content and the second content on the first client.

According to another aspect of the embodiments of the present application, a terminal device for synchronously displaying game content is further provided, the terminal device comprising one or more processors, memory coupled to the one or more processors and a plurality of programs stored in the memory that, when executed by the one or more processors, cause the terminal device to perform the aforementioned method for synchronously displaying game content.

According to yet another aspect of the embodiments of the present application, a non-transitory computer readable storage medium stores a plurality of machine readable instructions in connection with a terminal device having one or more processors, wherein the plurality of machine readable instructions, when executed by the one or more processors, cause the terminal device to perform the aforementioned method for synchronously displaying game content.

The present application further provides an electronic apparatus, including a memory, a processor, and a computer program stored on the memory and being capable of running on the processor, the processor being configured to execute the computer program to perform the foregoing method.

BRIEF DESCRIPTION OF THE DRAWINGS

The accompanying drawings described herein are used to provide a further understanding of the present application, and form a part of the present application. Exemplary embodiments of the present application and descriptions thereof are used to explain the present application, and do not constitute any inappropriate limitation to the present application. In the accompanying drawings.

DESCRIPTION OF EMBODIMENTS

Figure 1:
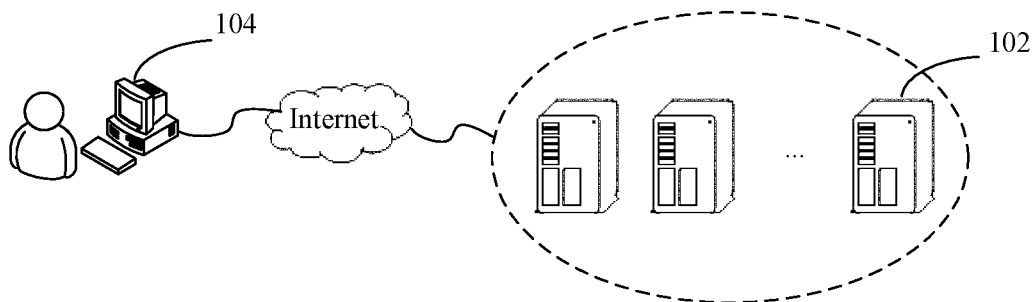
FIG. 1 is a schematic diagram of a hardware environment of a method for synchronously displaying game content according to an embodiment of the present application.

To make a person skilled in the art understand solutions of the present application better, the following clearly and completely describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

In the specification, claims, and accompanying drawings of the present application, the terms "first", "second", and the like are intended to distinguish between similar objects but do not necessarily indicate a specific order or sequence. The data termed in such a way are interchangeable in proper circumstances so that the embodiments of the present application described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

First, some terms that appear in the descriptions of the embodiments of the present application are explained as follows:

MMORPG is an abbreviation of Massive Multiplayer Online Role-Playing Game.

RTS is an abbreviation of Real-Time Strategy Game and is one type of strategy game. An RTS is played in real time rather than a common turn-based strategy game. In addition, a player often plays a general in an RTS to command armed forces.

NPC is an abbreviation of Non-Player-Controlled Character.

TCP is an abbreviation of Transmission Control Protocol. The TCP is a connection-oriented, reliable, and byte stream-based transport layer communication protocol and is defined by IETF RFC 793.

UDP is short for User Datagram Protocol. The UDP is a connectionless transport layer protocol in the open system interconnection (OSI) reference model, and provides a simple and unreliable transaction-oriented information transfer service. IETF RFC 768 is a formal specification for UDP. A protocol number of the UDP in an IP packet is 17.

A bullet hell game is a visual description of a scrolling shooter game. A player needs to have good eye-hand coordination and skillfully control the movement of a character to beat a bullet hell game. The screen in a bullet hell game is often filled with curtains of bullets. Due to some characteristics such as complex bullet curtains and numerous enemy artificial intelligence (AI) units of bullet hell games, a number of problems need to be resolved in the transformation of a bullet hell game into a multiplayer online game. For example, a round of game needs to be created in the game. A number of players need to be added to the created round of game. Content related to the game playing of other participants in the same round of game needs to be locally displayed. Consistent game behavior of operators and consistent AI behavior need to be ensured on different terminals. The participants need to communicate with each other, and timely information transmission needs to be ensured.

In some embodiments of the present application, the following synchronous display solutions are provided.

Solution 1. Use a C/S Synchronization Mode in MMORPG Games

The main feature of the C/S synchronization mode is that game logic runs on a server end. Clients are responsible for collecting operations of players and sending the operations to the server. The server broadcasts running results of the game to the clients at a fixed frame rate or in an event trigger mode, and the clients then play the running results. The clients usually make some limited predictions on the player's movement, skill casting, and other operations. However, final results depend on the server. Therefore, the predictions may include additional lags.

Figure 3:
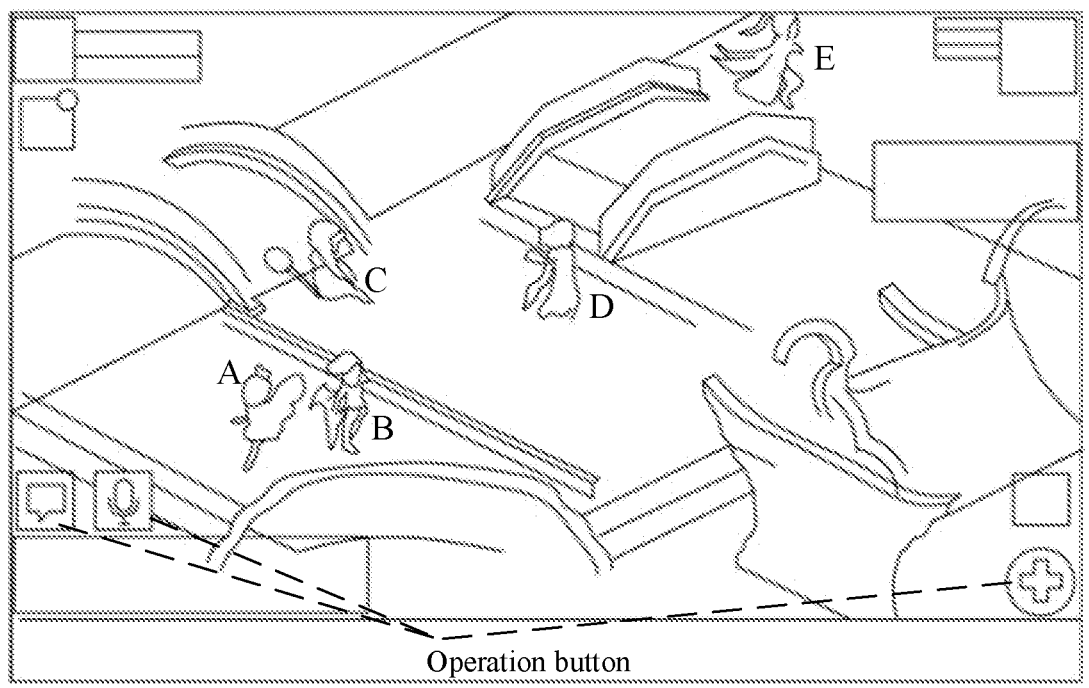
FIG. 3 is a schematic diagram of a game picture according to an embodiment of the present application.

The foregoing solution is applicable to multiplayer games such as MMORPG. In this type of game, there are many people on the same screen. As shown in FIG. 3, there are a character A, character B, character C, and the like that can be operated by operation buttons, has a relatively small number of operations, and does not require very low operation latency.

Solution 2 Use a Frame Synchronization Mode in RTS or MOBA Games

The main feature of the frame synchronization mode is that game logic runs on all clients, and the server receives inputs (input related to game operations) from the client in frames and broadcasts the inputs to the clients. The game logic on the clients is driven according to frames provided by the server. The game algorithm of the client is carefully designed, so that identical running results can be obtained by inputting the same frame delivered by the server. Some games also make some predictions on operations to reduce the experience degradation caused by latency in the input of each frame.

Figure 4:
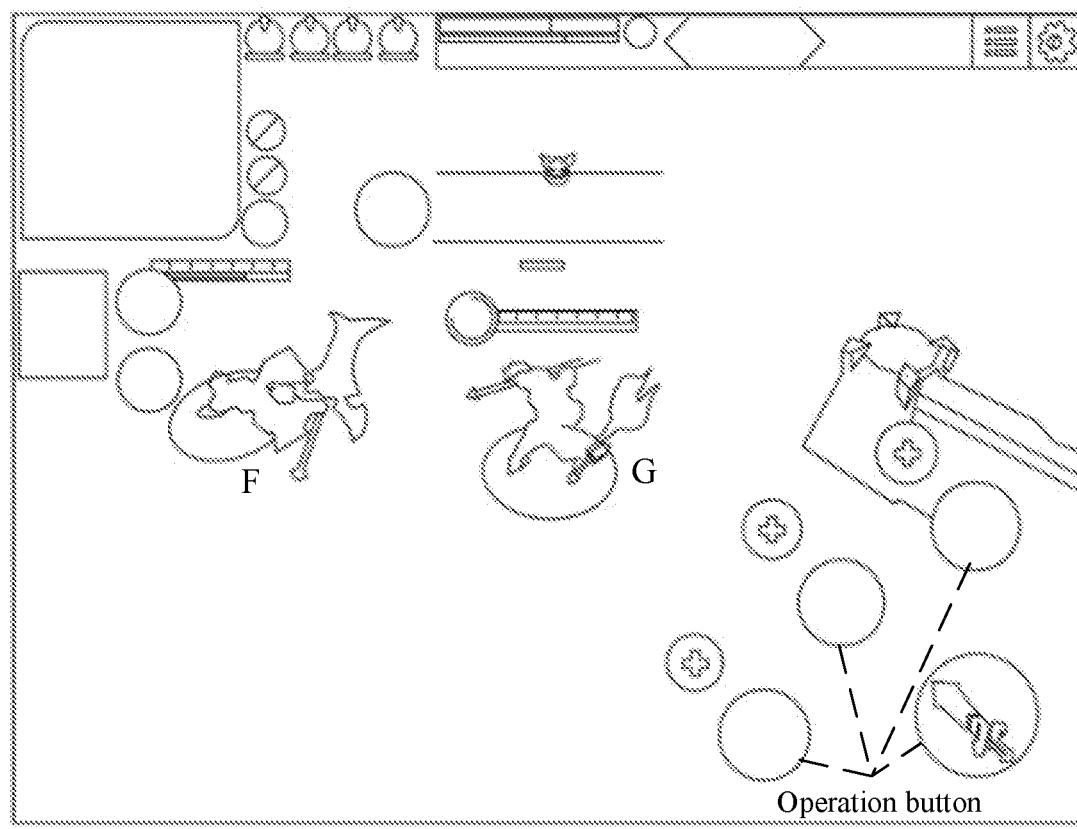
FIG. 4 is a schematic diagram of a game picture according to an embodiment of the present application.

The foregoing solution is applicable to games that involve a few clients and have many units. This type of game focuses on strategy instead of operations. As shown in FIG. 4, a character F and a character G are included and can be operated by operation buttons.

In the foregoing solution 1, there are the following technical problems:

(1) In the solution 1, the game logic runs on the server. The server bears heavy load. A single game server in a C/S mode can often support thousands of players, that is, has a relatively low support capacity. However, a bullet hell game has complex bullet curtains and numerous units, and therefore requires a huge amount of computation.

(2) In the solution 1, high network traffic is generated due to the synchronization of various game events such as the movements, skills, and drops of all units. Especially, for mobile games, the cost of traffic consumption is high because players often play games on mobile networks. However, a bullet hell game has complex bullet curtains and numerous enemy AI units, and therefore a huge amount of data needs to be synchronized.

(3) In the solution 1, there is particular latency because players' operational inputs are first sent to the server for computation. Such latency is unacceptable for bullet hell games that require precise control.

In the foregoing solution 2, there are the following technical problems:

(1) The solution 2 has high requirements for the design of game algorithm.

(2) There is high operation latency in the solution 2. Such operation latency is unacceptable for bullet hell games that require precise control.

To resolve foregoing technical problems, the present application further provides a solution 3. In the solution 3, game display is directly provided on a client according to game operations for bullet hell games. Currently, there is no precedent for real-time same-screen gameplay for web-based bullet hell games. In the present application, a synchronous display solution that meets such gameplay is implemented by using various innovative designs. According to the embodiments of the present application, a method embodiment of a method for synchronously displaying game content is provided.

In this embodiment, the foregoing method for synchronously displaying game content may be applied to a hardware environment formed by a server 102 and a terminal 104 shown in FIG. 1. As shown in FIG. 1, the server 102 is connected to the terminal 104 through a network. The network includes, but is not limited to, a wide area network, a metropolitan area network, and a local area network. The terminal 104 is not limited to a PC, a mobile phone, and a tablet computer. The method for synchronously displaying game content in this embodiment of the present application may be performed by the server 102 and the terminal 104 together. When the terminal 104 performs the method for synchronously displaying game content in this embodiment of the present application, the method may be alternatively performed by a client installed on the terminal 304. The following provides detailed descriptions with reference to FIG. 2.

Figure 2:
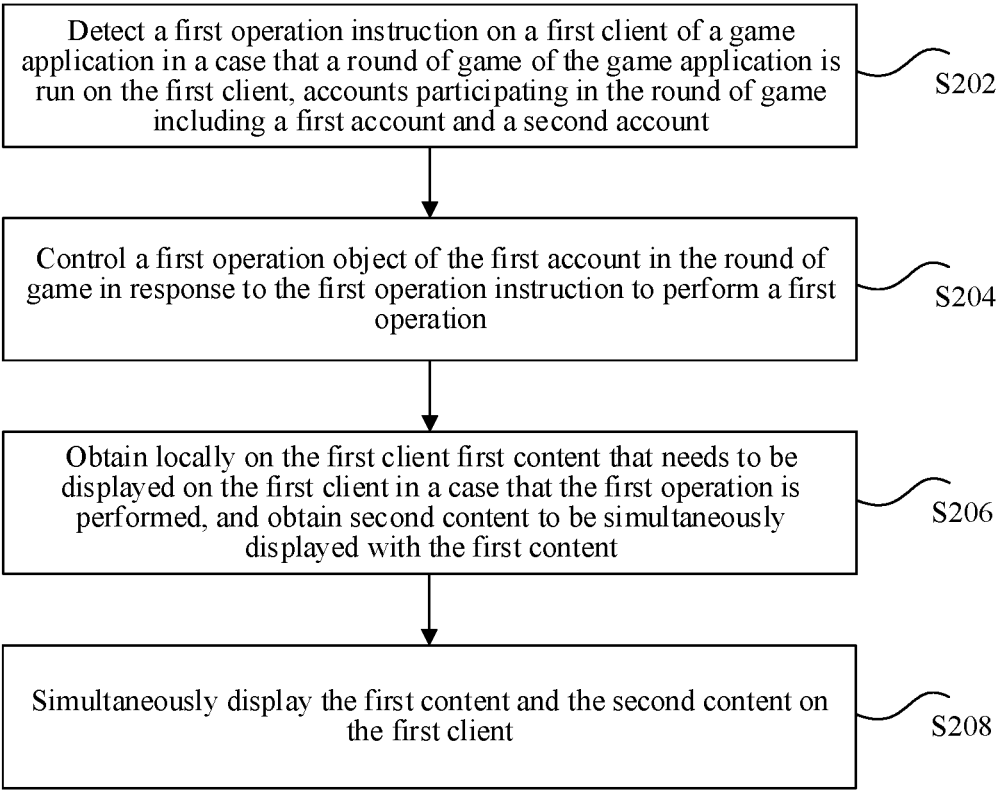
FIG. 2 is a flowchart of a method for synchronously displaying game content according to an embodiment of the present application.

FIG. 2 is a flowchart of a method for synchronously displaying game content according to an embodiment of the present application. As shown in FIG. 2, the method may include the following steps:

Step S202: Detect a first operation instruction on a first client of a game application in a case that a round of game of the game application is run on the first client, a first account being logged into on the first client, accounts participating in the round of game including the first account and a second account, and the second account being configured for login on a second client of the game application.

The game application may be a bullet hell game, an adventure game, a simulation game, a role-playing game, a casual game or another game. The implementations are basically the same when different types of games are implemented by using the method provided in the present application, and the bullet hell game is used as an example for subsequent description.

The first client is a game client formed by installing an installation package of the game application on a first terminal. The first operation instruction is an instruction generated by a first operator's operation (for example, a key operation, a touch operation, a gesture operation or the like) on the first terminal.

The first account and the second account are game accounts that are allowed in the game application, for example, accounts applied for in the game application, instant messaging accounts, Weibo accounts, social networking accounts or the like. The first account is an account used by the first operator on the first client, and the second account is an account used by the second operator on the second client. The first operator and the second operator are game participants who participate in the same round of game at the same time. The first operator is a local game participant on the first terminal, the second operator is generally a game participant other than the first operator, and there may be one or more second operators.

The second client is installed on a second terminal of the second operator, and the round of game is run synchronously on the second client.

Step S204: Control the first operation object of the first account in the round of game in response to the first operation instruction to perform a first operation.

When the foregoing step S204 is performed, the first operation that corresponds to the first operation instruction and is performed by the first operation object corresponding to the first account in the round of game is determined according to the first operation instruction.

The first operation object is a player character in the game application. The player character is a character controlled by a player in a role-playing game. Most player characters are key characters or main characters in a game story.

The first operation instruction is an instruction generated by an operation on the first terminal, for example, an instruction generated by swiping left or right on a touch screen. "Swiping left or right" is configured for instructing the first operation object to move left or right (that is, the first operation. The first operation object is controlled in response to the first operation instruction to move left or right.

Step S206: Obtain locally on the first client first content that needs to be displayed on the first client in a case that the first operation is performed, and obtain second content to be simultaneously displayed with the first content, the second content being content that needs to be displayed on the second client in a case that a second operation object of the second account in the round of game performs a second operation. In a case that the first content is obtained, it is determined that the first operation performed by the first operation object is to display the first content on the first client.

The game picture displayed on the first client may mainly include three parts. The first part is content related to game scenes that are unsusceptible to an operation of an operator. The second part is content (that is, the first content) related to an operation of the first operator (that is, the first account). The first content changes along with an operation of the first operator. The third part is content (that is, the second content) related to an operation of the second operator (that is, the second account). The second content changes along with an operation of the second operator. The first content corresponds to the first operation. The second content corresponds to the second operation. The first content and the second content being simultaneously displayed means that the first operation and the second operation are performed at the same time.

The first content and the second content are only content that changes in the game because of an operation of an operator in the game. Neither of the first content and the second content includes a rendering or display mode used for such changing content. The first content includes attribute information of the first operation object in the round of game. The attribute information is, for example, position information, information about whether the first operation object is hit, and information about an effect of hitting the first operation object. The first client on the terminal device sends attribute change information related to the first operation to the second client on another terminal device, and the second client on the another terminal device determines the first content according to the attribute change information. The attribute change information may include a moving direction, a moving distance, and the like. Correspondingly, the second content includes attribute information of the second operation object in the round of game. The attribute information is, for example, position information, information about whether the second operation object is hit, and information about an effect of hitting the second operation object.

The obtaining the first content locally on the first client is that the first terminal determines, according to the first operation instruction, the first operation that needs to be performed by the first operation object, and calculates, in the unit of game picture frame, the first content that needs to be displayed in each game picture frame in the process of performing the first operation.

For example, for a movement operation, during the movement of the first operation object, the first terminal calculates the position of the first operation object, the external action form of the first operation object, and the like in each game picture frame.

For another example, for a shooting operation, during the shooting by the first operation object, the first terminal calculates the position of each bullet, the rendering effect of a bullet, whether a bullet hits a game AI, an effect of hitting the game AI, and the like in each game picture frame.

In the foregoing method for obtaining the first content, the calculation is performed locally on the first terminal, to satisfy features such as fast tempo, complex bullet curtains, and numerous enemy AI units of shooter games. For example, if calculation is performed on a server side, local operation-related information of the first terminal needs to be transmitted to the server, the server performs calculation (if the server calculates display content of all terminals, the server bears excessively heavy computing load and has very low computing efficiency), and the first terminal then receives the display content delivered by the server. Both the time cost for transmission and the time cost for computation by the server are high, resulting in high display latency. Shooter games require highly real-time display. Therefore, the foregoing problems are resolved when the first content that needs to be displayed is calculated locally on the first terminal.

The second content that needs to be displayed simultaneously with the first content may be obtained from a synchronization server or the second terminal. Although there is some latency, the local first operator on the first terminal is not greatly affected. At the same time, the first operator can observe a related game scene of a companion (the second operator), making it convenient for the first operator and the second operator to cooperate in the game.

The method for obtaining the first content may be used to obtain the second content that needs to be displayed simultaneously with the first content. In this way, it can be ensured that the terminals have consistent game picture content, thereby improving the game experience of the game participants.

Step S208: Simultaneously display the first content and the second content on the first client.

In step S202 to step S208 described above, when the first client of the game application runs a round of game of the game application, the first operation instruction is detected on the first client, and the first operation object of the first account in the round of game is controlled to perform the first operation. The first client locally obtains the first content that needs to be displayed on the first client in a case that the first operation is performed, and obtains the second content to be simultaneously displayed with the first content, so that the first content of the first account and the second content of the second account in the round of game are simultaneously displayed on the first client. This resolves technical problem that the game content of other operators in the same round of game cannot be locally displayed in the related art, thereby achieving the technical effect of synchronous display of game content.

The features of this synchronous display solution are as follows. The movement and the hit by a bullet curtain can be calculated locally to provide a lead unit with the handle similar to that in a standalone game. In addition, the movement operations and hitting effects of teammates are synchronized locally through the server for simulated display. Communication messages are cut, combined, compressed, and otherwise processed to control traffic. Multi-channel communication is used to ensure the low latency and reliability of message synchronization. In addition, a consistency algorithm is used to ensure that two clients have identical levels, AI object behaviors, drops, and the like. Therefore, when players at different points on the Internet play the bullet hell games in a double-player mode, the players can experience smooth handle as in a standalone game and enjoy fighting side by side with teammates.

Descriptions are provided below with reference to FIG. 2 and FIG. 5.

Figure 5:
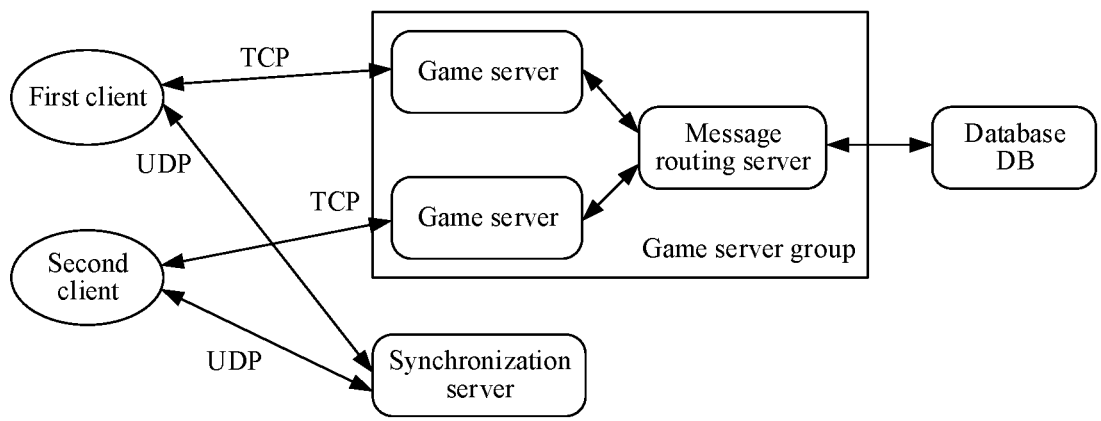
FIG. 5 is a schematic diagram of a game service architecture according to an embodiment of the present application.

The game architecture of the present application is shown in FIG. 5. Clients connect to respective game servers in TCP mode to play games. In a double-player mode (that is, an online game mode), a client finds a teammate through server matchmaking (server interaction) (or by inviting a friend). The game servers allocate a synchronization server and a game room for a current round of double-player game. Both clients connect to the synchronization server in UDP mode at the same time to play. The game logic mainly runs on the clients, and most synchronization messages are transmitted through the synchronization server. Some important messages (for example, a resurrection deduction) are processed and relayed through the game servers connected to the clients in TCP, and stored in the database (DB). When a game is over, both parties report results to the game servers, and the game servers make a final settlement for a round of game.

In the technical solution provided in step S202, in a case that a round of game of a game application is run on a first client of the game application, a first operation instruction is detected on the first client.

When a round of game of the game application is run on the first client of the game application, the round of game is run on the first client according to an instruction of instruction information in a case that the first client receives the instruction information delivered by the game server. Similarly, for the second client, the same round of game is run on the second client according to the received instruction information.

The instruction information is configured for instructing the first client and the second client to run a round of game at the same moment. The instruction information is further configured for instructing the first client and the second client to perform events related to a non-player control object at the same moment.

When the first operator performs a game operation on the first terminal, the first terminal generates a first operation instruction according to a detected signal of the game operation, and sends the first operation instruction to the first client.

Similarly, for the second client, when the second operator performs a game operation on the second terminal, the second terminal generates a second operation instruction according to a detected signal of the game operation, and sends the second operation instruction to the second client.

In the game application, the attribute change information related to the first operation and the second operation is exchanged between the first client and the second client through the synchronization server, and is specifically transmitted through a UDP channel connected to the synchronization server.

In the technical solution provided in step S204, the first operation object of the first account in a round of game is controlled in response to the first operation instruction to perform the first operation.

In the process of performing the first operation, the first terminal needs to perform render and display game pictures on the first client from the beginning to the end of the first operation.

The first operation may be divided into several sub-operations in the unit of logical frame, and a logical frame corresponds to a sub-operation. The first operation object or an object related to the first operation in the game has a state. The state may be described by using an attribute, so that the difference between states of sub-operations of two adjacent logical frames may be described by using attribute change information.

For example, when the first operation object performs a movement operation, in a first logical frame, attribute change information, configured for describing a position attribute change amount between a current position of the first operation object and a position of the first operation object in a previous logical frame, of the first operation object is sent to the second client on the second terminal.

Specifically, the first client locally calculates the position attribute change amount, and transmits second attribute change information (including position attribute change information) to the synchronization server in a data transmission channel. The synchronization server forwards the second attribute change information to the second client. The second attribute change information is information configured for describing a change of a position attribute of the first operation object and/or a change of an attribute related to a shooting operation.

Similarly, the second client also locally calculates position attribute change amount, and transmits first attribute change information (including calculated position attribute change information) to the synchronization server in the data transmission channel. The synchronization server forwards the first attribute change information to the first client. The first attribute change information is information configured for describing a change of a position attribute of the second operation object and/or a change of an attribute related to a shooting operation.

In the technical solution provided in step S206, first content that needs to be displayed on the first client in a case that the first operation is performed is obtained locally on the first client, and second content to be simultaneously displayed with the first content is obtained. The second content is content that needs to be displayed on the second client in a case that a second operation object of the second account in the round of game performs a second operation.

(1) About Obtaining of the First Content

That obtaining locally on the first client the first content that needs to be displayed on the first client in a case that the first operation is performed includes at least one of the following: determining locally on the first client the first content configured for indicating a position at which the first operation object is located after a position attribute of the first operation object is changed in a case that the first operation is an operation of changing the position attribute of the first operation object; or, determining locally on the first client the first content configured for indicating content related to shooting in a case that the first operation is a shooting operation of the first operation object.

For example, for the movement operation of the first operation object, according to a preset time interval between logical frames and a preset object movement speed and in consideration of an operation direction of the first operator, a distance that the first operation object can move in each logical frame and a position of the first operation object after the movement are determined locally on the first terminal. The first content at least includes content for showing the position of the first operation object after the movement.

For another example, for the shooting operation, according to a preset time interval between logical frames and a preset bullet movement speed and in consideration of an operation direction of the first operator, a distance that a bullet can move in each logical frame and a position of the bullet after the movement are determined locally on the first terminal. The first content at least includes content for showing the position of the bullet after the movement and also includes content related to whether an AI is hit and an effect of hitting the AI.

(2) About Obtaining of the Second Content

The foregoing has described how the second client sends the first attribute change information. When the first client obtains the second content that needs to be displayed simultaneously with the first content, the first attribute change information forwarded by the second client through the synchronization server is received in the data transmission channel. The first attribute change information is configured for describing an attribute change caused by the second operation object performing the second operation in the round of game. The second operation is an operation triggered by a second operation instruction detected on the second client. The second content is determined locally on the first client according to the first attribute change information.

For example, for the movement operation of the second operation object, a position of the second operation object at the current moment may be determined according to a position of the second operation object at the previous moment and the first attribute change information. The first attribute change information may specifically include a direction and a quantity of unit distances of movement of the second operation object.

In the technical solution provided in step S208, the first content and the second content are simultaneously displayed on the first client. The first terminal superimposes the second content determined according to the first attribute change information on a game picture of the first client for display, where the game picture of the first client is a picture displaying the first content.

To distinguish between the game behavior of the first operation object and that of the second operation object, when the second content determined according to the first attribute change information is superimposed on the game picture of the first client for display, the superimposed second content may be displayed on the game picture of the first client in a second display mode while the first content is displayed on the game picture of the first client in a first display mode, where the first display mode is different from the second display mode.

Figure 6:
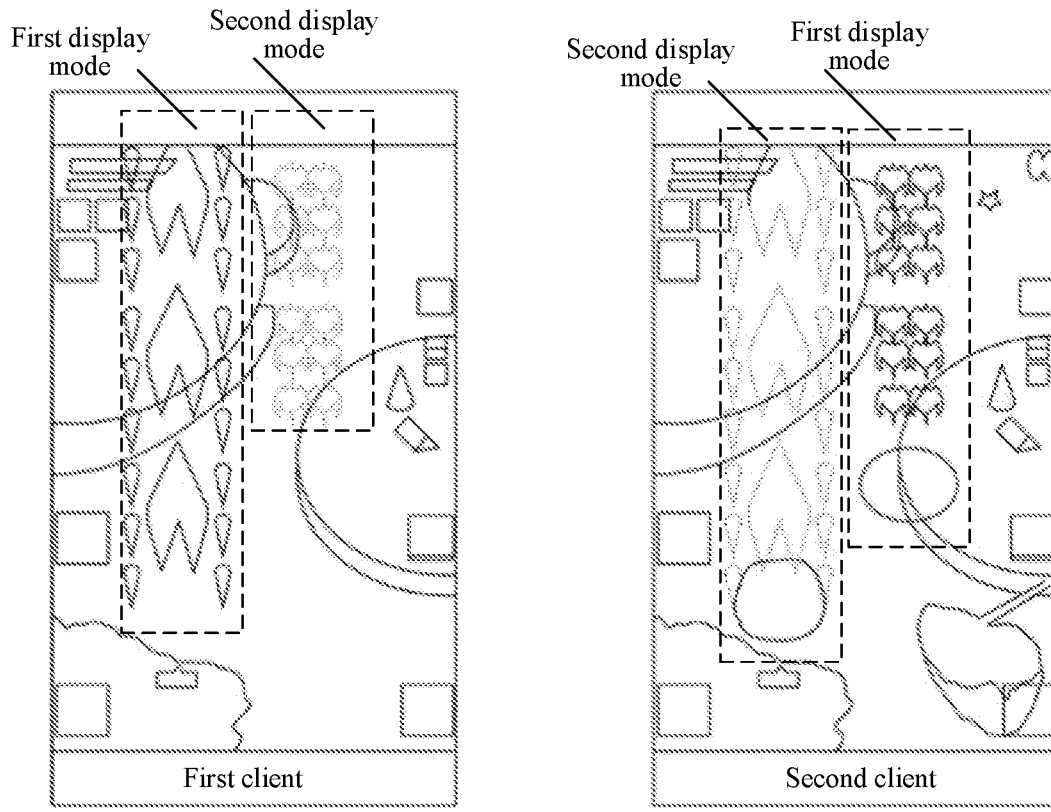
FIG. 6 is a schematic diagram of a game picture according to an embodiment of the present application.

As shown in FIG. 6, the game picture of the first client is shown on the left, and the game picture of the second client is shown on the right. A lead unit (the first operation object on the first client or the second operation object on the second client) is displayed in a normal mode, and a friendly unit (the second operation object on the first client or the first operation object on the second client) is displayed in a translucent mode (indicated by a dotted line in FIG. 6).

(3) How to Re-Enter a Game after Disconnection

After the first client of the game application runs a round of game of the game application, the first client obtains a current progress time of the round of game from the second client in a case that the first client is disconnected and connected again, and determines, in a plurality of reference time marks of the round of game, a target reference time mark that is adjacent to the current progress time and has arrived, where the reference time marks are pre-identified moments in the progress time of the round of game. The round of game is reloaded on the first client, and a game picture of the reloaded round of game is updated from a first picture to a second picture, where the first picture is a game picture at the target reference time mark in the round of game, and the second picture is a game picture at the current progress time in the round of game.

There may be various causes of disconnection. For example, a client is turned off due to an exception, a user turns off a client, a user exits a game, and a network is interrupted.

When the first client is disconnected and then connected again, the first client obtains a current progress time from the second client, and then calculates a reference time mark (that is, a target reference time mark) according to the progress time. The time mark is before the current progress time. A difference between the current time mark and the closet target reference time mark is determined, and attribute information of the current time mark is determined according to the difference and attribute information of the target reference time mark. The first client performs rapid computation starting from this reference mark. A computing speed is 50 to 100 times a normal game speed (depending on the performance of the client), and catches up with the current progress time of the second client. This process is included in disconnection and reconnection logic. When a disconnection and reconnection process is completed, the first client and the second client are at the same time mark, start to display the game picture, and enter a normal game process.

Figure 7:
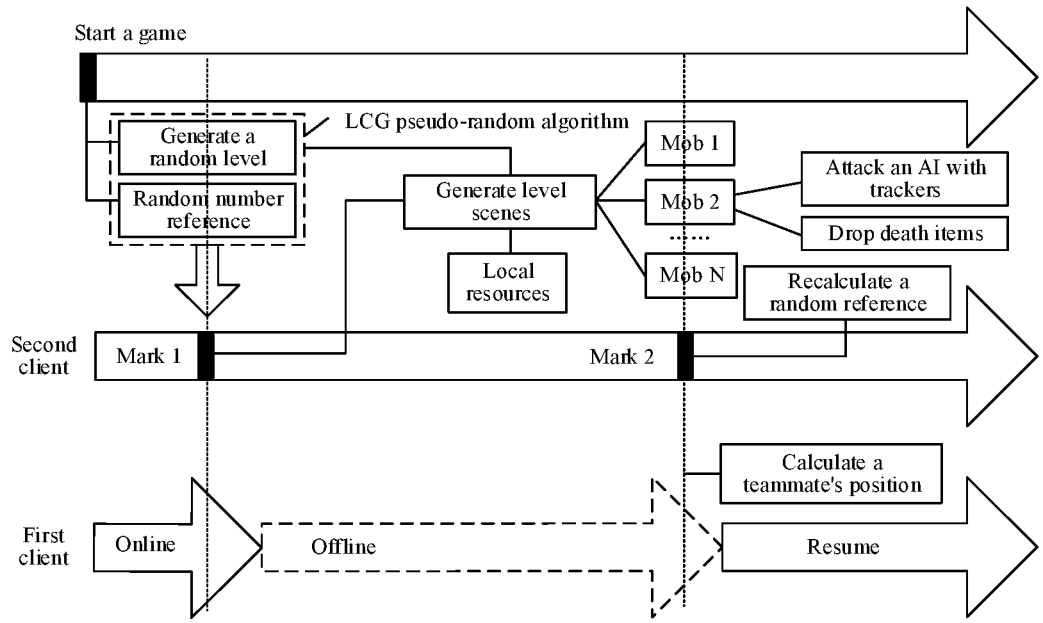
FIG. 7 is a schematic diagram of a game being run according to an embodiment of the present application.

As shown in FIG. 7, in the present application, the game can be calculated from any reference time mark (for example, a mark 1 and a mark 2) by using a random reference separation method with a plurality of time marks.

When the game starts, a starting moment of the game progress is determined according to information (for example, a starting random number) delivered by the server. A random reference for each time mark is calculated from a random reference at the start of the game. A random level and a random number reference are generated starting from the mark 1, and level scenes (for example, a mob 1 to a mob N) are generated by using local resources. When a client (for example, the first client) is disconnected and then reconnected, the client obtains a current game progress time from a teammate (the second client), calculates a latest random reference time value (the mark 2) according to this time, calculates a game scene (for example, a position of the teammate) from this time reference to the current game time, and then starts the game at normal speed (that is, resume the game, attack an AI with trackers, drop death items, and the like). An appropriate interval, neither too long nor too short, is recommended between the reference time marks.

For example, a round of a double-player game of Plane Wars can be divided into about 20 levels, and each level is about 2 minutes long. Time marks defined by using this time interval are appropriate. Whenever a client is disconnected and then reconnected in the game, the calculation is performed backwards from the start of the current level, and any time point in the current level can be calculated within about 1 second. In this way, the impact of disconnection is imperceptible to players.

It is required that objects in the game have consistent behaviors on different clients, which means that behaviors of objects need to be consistent on clients of a plurality of players in the same round of game. For example, the same level sequence is used. The same level scenes are provided. The same NPC appears at the same time. The same NPC has the same AI behavior and drops the same item when it dies.

Before the random level and the random number reference are generated, the game server delivers a same starting random number to all clients at the start of the game. The clients generate, by using the same pseudo-random recursive algorithm (for example, an LCG pseudo-random algorithm or another similar algorithm) starting from this random number, random numerical values (that is, random number reference marks) required for the running of modules in the game. To avoid interference between modules, each module uses a value transformed from an initial random value as a reference.

The clients can have consistent behavior in the game by using the same algorithm and the same initial input random number, and can restart the game and ensure the consistency of the game even if disconnection occurs.

(4) About Communication Between Clients

When the first client of the game application runs a round of game of the game application, a message set that is to be sent to the second client is processed on the first client before being sent. The processing includes: preprocessing first messages in the message set, where the preprocessing includes replacing a plurality of first messages of the same type in the message set with a second message, and the second message is configured for representing the plurality of first messages of the same type; packing all messages in the preprocessed message set into a message packet; and compressing the message packet.

Before the second attribute change information is transmitted to the synchronization server in the data transmission channel, the method further includes: preprocessing the first messages transmitting the attribute change information, where the preprocessing includes generating a second message from the plurality of first messages of the same type, and the second message is configured for representing the plurality of first messages of the same type; packing all the second messages into a message packet; and compressing the message packet.

Figure 8:
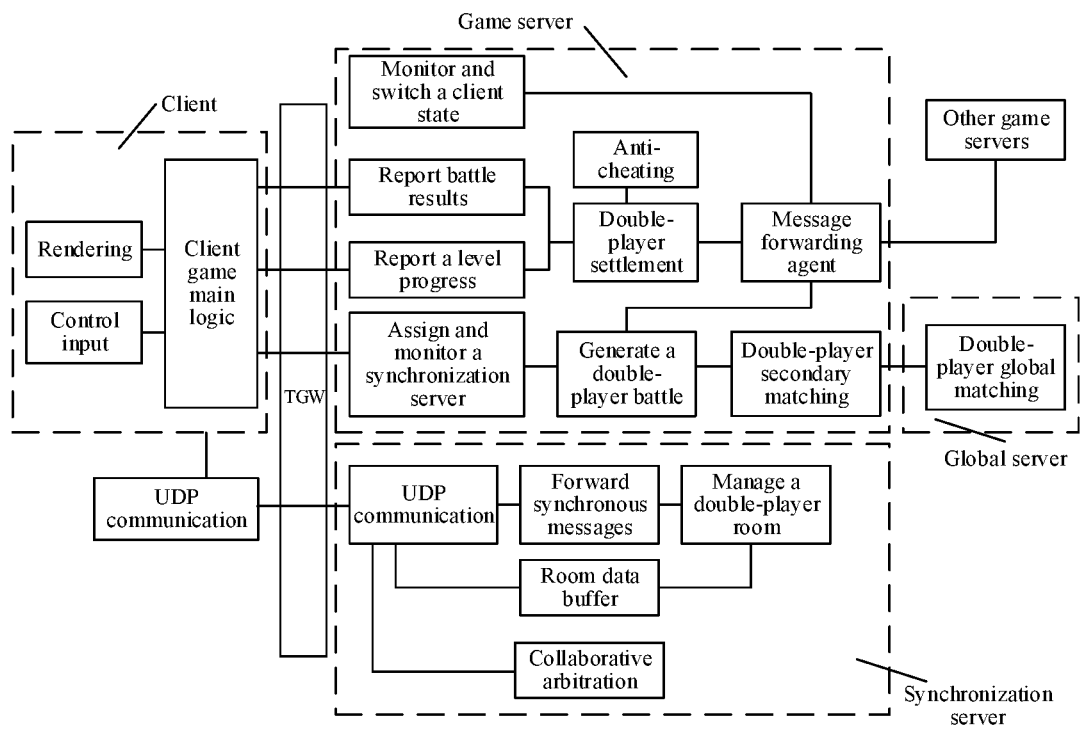
FIG. 8 is a schematic diagram of a game being run according to an embodiment of the present application.

As shown in FIG. 5 and FIG. 8, a communication method using both a TCP connection and a UDP connection is used in the present application. A TCP channel is configured for transmitting game control information (which is mainly transmitted between a client and a game server), reporting a level progress and some key messages, for example, the start/end of the game, battle results (configured for double-player settlement and anti-cheating judgment), and a resurrection deduction in a battle. These messages relate to the change of a game state or the consumption of player resources that needs to be implemented by the game server. For example, at the start of a game, the game server assigns a synchronization server to the clients, performs monitoring through the TCP channel, generates a double-player battle, and performs double-player secondary matching. Finally, a global server performs double-player global matching. Progress information in the game is transmitted to other game servers through the TCP channel.

TGW in FIG. 8 is an abbreviation of Tencent Gateway. A TGW is a system that implements multi-network unified access, forwards an external network request, and supports automatic load balancing.

The UDP channel is the connection between the client and the synchronization server. The synchronization server provides a fast and low-latency message forwarding service in the UDP mode. There are two types of messages in the UDP channel. One type of messages is transmitted in an unreliable transmission mode and mainly includes synchronization messages such as a position synchronization message, a health power (HP) synchronization message, a skill behavior message, and an item performance message. A common feature of these synchronization messages is that these messages are replaced by subsequent messages in a case of getting lost in the middle. Therefore, these messages do not need to be retransmitted, but instead are quickly forwarded. This ensures that such messages can reach a peer client more quickly without network congestion caused by operations such as retransmission in a case of a loss. In addition, a few messages (for example, the start/end of the room, progress saving, and collaborative arbitration of key events) need to be correctly transmitted to the peer client. These messages are transmitted in reliable UDP mode. Reliable UDP transmission is mainly implemented by using a sequence number of a message and an acknowledgement from a receiver, and a data message is buffered in the synchronization server, so that a double-player room can be managed.

When messages are transmitted in TCP or UDP, the messages need to be processed. The traffic of the messages can be further reduced by cutting synchronous messages, combining synchronous messages, combining a plurality of packets, and compressing packets.

Messages are transmitted in logical frames. A quantity of logical frames per second is about 10 to 14. In the same frame, if a plurality of related events occur successively, message cutting and message combination can be applied.

In message cutting, if one of messages of the same object can replace a previous message, the previous message can be discarded. For example, for movement messages of the lead unit in the same frame, only the last coordinate position needs to be sent. The same game object dies once the HP is exhausted, and only a death message needs to be sent.

In message combination, if messages of the same object have a superposition relationship, a plurality of messages can be combined into one message. If there are messages of a plurality of HP deductions of the same game object, the plurality of HP deductions can be combined into one deduction. The HP deductions are added.

In the combination of a plurality of packets, a plurality of different events occur in the same frame, and the events are combined into a relatively large data packet for transmission. Transmission of a single a plurality of large packets is better than transmission of a plurality of small packets.

In packet compression, each packet to be transmitted is compressed by using an algorithm to further reduce the size of the packet, thereby reducing traffic.

In the double-player gameplay of Plane Wars, after the foregoing processing, the traffic of each client can be controlled at about 1 KB/S. In this way, the double-player game can be played normally even in a 2G network.

Compared with the solution 1, the solution 3 of the present application has the following differences:

(1) In the solution 1, the game logic runs on the server. The server bears heavy load. A single game server in a C/S mode can often support thousands of players, that is, has a relatively low support capacity. However, a bullet hell game has complex bullet curtains and numerous units, and therefore requires a huge amount of computation. Therefore, in the solution 3, the game logic runs on the local client, thereby reducing the load on the game server.

(2) In the solution 1, high network traffic is generated due to the synchronization of various game events such as the movements, skills, and drops of all units. Especially, for mobile games, the cost of traffic consumption is high because players often play games on mobile networks. However, a bullet hell game has complex bullet curtains and numerous enemy AI units, and therefore a huge amount of data needs to be synchronized. Traffic consumption can be reduced by using the message transmission method in the solution 3.

(3) In the solution 1, there is particular latency because players' operational inputs are first sent to the server for computation. Such latency is unacceptable for bullet hell games that require precise control. In the solution 3, game responses are made locally, thereby avoiding latency problems.

The solution 2 and the solution 3 of the present application have the following differences:

(1) For the design of game algorithm, the solution 2 has high requirements while the solution 3 has relatively low requirements.

(2) There is high operation latency in the solution 2. Such operation latency is unacceptable for bullet hell games that require precise control. In the solution 3, game responses are made locally, thereby avoiding latency problems.

As can be seen from the analysis, the solution 3 of the present application has the following advantages.

(1) The game algorithm logic is executed on the client, the consistency algorithm is used to ensure the consistency of the game on clients, and high bearing performance of servers is maintained.

(2) Bullet hell games need to offer exquisite handle. In the solution 3, the operations of a lead unit are calculated in real time on a current client, so as to provide an operational experience similar to that in a standalone game.

(3) For mobile networks with unstable network connection and high traffic cost, a multi-channel synchronous communication method suitable for mobile networks is designed, thereby ensuring that the latency of messages is as low as possible and reliability requirements of some messages are met. In addition, traffic is optimized.

As an embodiment, Plane Wars is used as an example for description.

FIG. 6 shows mobile double-player gameplay of Plane Wars. In FIG. 6, a lead unit (the plane drawn by a solid line) is a plane (that is, a first operation object) controlled by a player on a current client. The lead unit, a bullet curtain fired by the lead unit, a pet carried by the lead unit, and a bullet curtain fired by the pet are all calculated in real time by the client of the lead unit to produce effects. The effects are instantly displayed in the game interface. In this case, a player plays the game as it is a standalone game. Without any latency, a player can move a fighter rapidly to dodge bullet curtains fired by enemy planes quickly and precisely fire at approaching enemy planes.

In FIG. 6, a friendly unit (the plane drawn by a dotted line) is a fighter controlled by a friend player and displayed synchronously through the network. To avoid visual interference with the lead unit, a bullet curtain fired by the friendly unit and a pet carried by the friendly unit are translucently displayed and cannot be controlled by the player of the lead unit. However, in the game picture, the player of the lead unit can observe effects of attacking the enemy unit by the friend player, thereby providing pleasant and cooperative game experience.

Enemy units, bullet curtains fired by enemy units, and various drops are highly consistent on the clients through the design of a client algorithm. Such content may be not synchronously transmitted between the two clients.

In the embodiments of the present application, a client level consistency algorithm is combined with localization control and hit calculation of the lead unit, and behavior effects are synchronized to a teammate's client to implement a solution for web-based same-screen real-time game process for bullet hell games that require precise control and have numerous game objects and complex game logic operations, thereby implementing adequate player experience while finding an optimum balance between performance and traffic.

In the present application, a shooter game is merely used as an example for description. For other types of games, the technical solution in the embodiments of the present application may also be used to ensure the synchronous display in a game and lower network requirements. The specific implementation is similar to that of the shooter games, and is not described herein again.

For brief description, the foregoing method embodiments are represented as a series of action combinations. However, it is to be appreciated by a person skilled in the art that the present application is not limited to the described order of the actions, because according to the present application, some steps may be performed in other orders or simultaneously. In addition, it is to be appreciated by a person skilled in the art that all the embodiments described in the specification are some embodiments, and the related actions and modules are not necessarily required in the present application.

Through the foregoing description of the implementations, it is clear to a person skilled in the art that the methods in the foregoing embodiments may be implemented by software plus a necessary universal hardware platform, and certainly may also be implemented by hardware, but in many cases, the software implementation is exemplary. Based on such an understanding, the technical solutions of the present application essentially or the part contributing to the existing technology may be implemented in a form of a software product. The computer software product is stored in a storage medium (such as a read-only memory (ROM)/a random access memory (RAM), a magnetic disk or an optical disc) and includes several instructions for instructing a terminal device (which may be a mobile phone, a computer, a server, or a network device) to perform the methods described in the embodiments of the present application.

Figure 9:
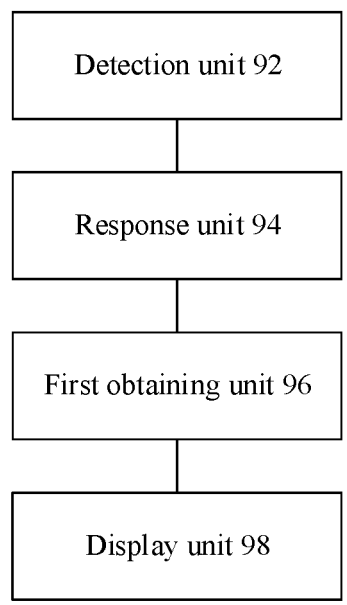
FIG. 9 is a schematic diagram of an apparatus for synchronously displaying game content according to an embodiment of the present application.

According to an embodiment of the present application, an apparatus for synchronously displaying game content configured to implement the foregoing method for synchronously displaying game content is further provided. FIG. 9 is a schematic diagram of an apparatus for synchronously displaying game content according to an embodiment of the present application. As shown in FIG. 9, the apparatus may include a detection unit 92, a response unit 94, a first obtaining unit 96, and a display unit 98.

The detection unit 92 is configured to detect a first operation instruction on a first client of a game application in a case that a round of game of the game application is run on the first client, a first account being logged into on the first client, accounts participating in the round of game including the first account and a second account, and the second account being configured for login on a second client of the game application.

The game application may be a bullet hell game, an adventure game, a simulation game, a role-playing game, a casual game or another game. The implementations are basically the same when different types of games are implemented by using the method provided in the present application, and the bullet hell game is used as an example for subsequent description.

The first client is a game client formed by installing an installation package of the game application on a first terminal. The first operation instruction is an instruction generated by a first operator's operation (for example, a key operation, a touch operation, a gesture operation or the like) on the first terminal.

The first account and the second account are game accounts that are allowed in the game application, for example, accounts applied for in the game application, instant messaging accounts, Weibo accounts, social networking accounts or the like. The first account is an account used by the first operator on the first client, and the second account is an account used by the second operator on the second client. The first operator and the second operator are game participants who participate in the same round of game at the same time. The first operator is a local game participant on the first terminal, the second operator is generally a game participant other than the first operator, and there may be one or more second operators.

The second client is installed on a second terminal of the second operator, and the round of game is run synchronously on the second client.

The response unit 94 is configured to determine, according to the first operation instruction, a first operation that corresponds to the first operation instruction and is performed by a first operation object corresponding to the first account in the round of game.

The first operation object is a player character in the game application. The player character is a character controlled by a player in a role-playing game. Most player characters are key characters or main characters in a game story.

The first operation instruction is an instruction generated by an operation on the first terminal, for example, an instruction generated by swiping left or right on a touch screen. "Swiping left or right" is configured for instructing the first operation object to move left or right (that is, the first operation. The first operation object is controlled in response to the first operation instruction to move left or right.

The first obtaining unit 96 is configured to: determine first content that needs to be displayed on the first client in a case that the first operation object performs the first operation, and obtain second content to be simultaneously displayed with the first content, the second content being content that needs to be displayed on the second client in a case that a second operation object corresponding to the second account in the round of game performs a second operation.

The game picture displayed on the first client may mainly include three parts. The first part is content related to game scenes that are unsusceptible to an operation of an operator. The second part is content (that is, the first content) related to an operation of the first operator (that is, the first account). The first content changes along with an operation of the first operator. The third part is content (that is, the second content) related to an operation of the second operator (that is, the second account. The second content changes along with an operation of the second operator.

The first content and the second content are only content that changes in the game because of an operation of an operator in the game. Neither of the first content and the second content includes a rendering or display mode used for such changing content.

The obtaining the first content locally on the first client is that the first terminal determines, according to the first operation instruction, the first operation that needs to be performed by the first operation object, and calculates, in the unit of game picture frame, the first content that needs to be displayed in each game picture frame in the process of performing the first operation.

For example, for a movement operation, during the movement of the first operation object, the first terminal calculates the position of the first operation object, the external action form of the first operation object, and the like in each game picture frame.

For another example, for a shooting operation, during the shooting by the first operation object, the first terminal calculates the position of each bullet, the rendering effect of a bullet, whether a bullet hits a game AI, an effect of hitting the game AI, and the like in each game picture frame.

In the foregoing method for obtaining the first content, the calculation is performed locally on the first terminal, to satisfy features such as fast tempo, complex bullet curtains, and numerous enemy AI units of shooter games. For example, if calculation is performed on a server side, local operation-related information of the first terminal needs to be transmitted to the server, the server performs calculation (if the server calculates display content of all terminals, the server bears excessively heavy computing load and has very low computing efficiency), and the first terminal then receives the display content delivered by the server. Both the time cost for transmission and the time cost for computation by the server are high, resulting in high display latency. Shooter games require highly real-time display. Therefore, the foregoing problems are resolved when the first content that needs to be displayed is calculated locally on the first terminal.

The second content that needs to be displayed simultaneously with the first content may be obtained from a game server or the second terminal. Although there is some latency, the local first operator on the first terminal is not greatly affected. At the same time, the first operator can observe a related game scene of a companion (the second operator), making it convenient for the first operator and the second operator to cooperate in the game.

The method for obtaining the first content may be used to obtain the second content that needs to be displayed simultaneously with the first content. In this way, it can be ensured that the terminals have consistent game picture content, thereby improving the game experience of the game participants.

The display unit 98 is configured to simultaneously display the first content and the second content on the first client.

The detection unit 92 in this embodiment may be configured to perform step S202 in the method for synchronously displaying game content of the present application, the response unit 94 in this embodiment may be configured to perform step S204 in the method for synchronously displaying game content of the present application, the first obtaining unit 96 in this embodiment may be configured to perform step S206 in the method for synchronously displaying game content of the present application, and the display unit 98 in this embodiment may be configured to perform step S208 in the method for synchronously displaying game content of the present application.

Examples and application scenarios implemented by the foregoing modules and corresponding steps are the same but are not limited to the content disclosed in the foregoing method for synchronously displaying game content. The foregoing modules, as a part of the apparatus, can run in the hardware environment shown in FIG. 1, may be implemented by software, or may be implemented by hardware.

By using the foregoing modules, when the first client of the game application runs a round of game of the game application, the first operation instruction is detected on the first client, and the first operation object of the first account in the round of game is controlled to perform the first operation. The first client locally obtains the first content that needs to be displayed on the first client in a case that the first operation is performed, and obtains the second content to be simultaneously displayed with the first content, so that the first content of the first account and the second content of the second account in the round of game are simultaneously displayed on the first client. This resolves technical problem that the game content of other operators in the same round of game cannot be locally displayed in the related art, thereby achieving the technical effect of synchronous display of game content.

When the detection unit of the present application runs a round of game of the game application on the first client of the game application, the round of game is run on the first client according to an instruction of instruction information in a case that the first client receives the instruction information delivered by the game server. Similarly, for the second client, the same round of game is run on the second client according to the received instruction information.

The first obtaining unit includes: an obtaining module, configured to obtain first attribute change information delivered by the second client, where the first attribute change information is configured for describing an attribute change caused by the second operation object performing the second operation in the round of game, and the second operation is an operation triggered by a second operation instruction detected on the second client; and a determining module, configured to determine the second content on the first client according to the first attribute change information.

The display unit is further configured to superimpose the second content determined according to the first attribute change information on a game picture of the first client for display, where the game picture of the first client is a picture displaying the first content. The display unit includes: a display module, configured to display the superimposed second content on the game picture of the first client in a second display mode while the first content is displayed on the game picture of the first client in a first display mode, where the first display mode is different from the second display mode.

The foregoing has described how the second client sends the first attribute change information. When the first client obtains the second content that needs to be displayed simultaneously with the first content, the first attribute change information forwarded by the second client through the synchronization server is received in a data transmission channel. The first attribute change information is configured for describing an attribute change caused by the second operation object performing the second operation in the round of game, and the second operation is an operation triggered by a second operation instruction detected on the second client. The second content is determined locally on the first client according to the first attribute change information.

For example, for the movement operation of the second operation object, a position of the second operation object at the current moment may be determined according to a position of the second operation object at the previous moment and the first attribute change information. The first attribute change information may specifically include a direction and a quantity of unit distances of movement of the second operation object.

The obtaining module is further configured to receive, in a data transmission channel, the first attribute change information forwarded by the second client through a synchronization server, where the data transmission channel is a channel connected to the synchronization server and transmitting data by using the UDP.

That the first obtaining unit of the present application obtains locally on the first client the first content that needs to be displayed on the first client in a case that the first operation is performed includes at least one of the following: determining locally on the first client the first content configured for indicating a position at which the first operation object is located after a position attribute of the first operation object is changed in a case that the first operation is an operation of changing the position attribute of the first operation object; and the first content configured for indicating content related to shooting is determined locally on the first client in a case that the first operation is a shooting operation of the first operation object.

For example, for the movement operation of the first operation object, according to a preset time interval between logical frames and a preset object movement speed and in consideration of an operation direction of the first operator, a distance that the first operation object can move in each logical frame and a position of the first operation object after the movement are determined locally on the first terminal. The first content at least includes content for showing the position of the first operation object after the movement.

For another example, for the shooting operation, according to a preset time interval between logical frames and a preset bullet movement speed and in consideration of an operation direction of the first operator, a distance that a bullet can move in each logical frame and a position of the bullet after the movement are determined locally on the first terminal. The first content at least includes content for showing the position of the bullet after the movement and also includes content related to whether an AI is hit and an effect of hitting the AI.

After the first obtaining unit obtains locally on the first client the first content that needs to be displayed on the first client in a case that the first operation is performed, the first obtaining unit transmits second attribute change information to the synchronization server in a data transmission channel, where the game server is configured to forward the second attribute change information to the second client, the second attribute change information is information configured for describing a change of the position attribute and/or a change of an attribute related to the shooting operation, and the data transmission channel is a channel connected to the synchronization server and transmitting data by using the UDP.

The apparatus of the present application further includes: a second obtaining unit, configured to obtain a current progress time of the round of game from the second client in a case that the first client is disconnected; a determining unit, configured to determine, in a plurality of reference time marks of the round of game, a target reference time mark that is adjacent to the current progress time and has arrived, where the reference time marks are pre-identified moments in the progress time of the round of game; and a loading unit, configured to: reload the round of game on the first client, and update a game picture of the reloaded round of game from a first picture to a second picture, where the first picture is a game picture at the target reference time mark in the round of game, and the second picture is a game picture at the current progress time in the round of game.

When the first client of the game application runs a round of game of the game application, the apparatus of the present application needs to process a message set that is to be sent to the second client before sending. The processing includes: preprocessing first messages in the message set, where the preprocessing includes replacing a plurality of first messages of the same type in the message set with a second message, and the second message is configured for representing the plurality of first messages of the same type; packing all messages in the preprocessed message set into a message packet; and compressing the message packet.

In the embodiments of the present application, a client level consistency algorithm is combined with localization control and hit calculation of the lead unit, and behavior effects are synchronized to a teammate's client to implement a solution for web-based same-screen real-time game process for bullet hell games that require precise control and have numerous game objects and complex game logic operations, thereby implementing adequate player experience while finding an optimum balance between performance and traffic.

Examples and application scenarios implemented by the foregoing modules and corresponding steps are the same but are not limited to the content disclosed in the foregoing method for synchronously displaying game content. The foregoing modules may run, as a part of the apparatus, in the hardware environment shown in FIG. 1, and may be implemented by using software, or may be implemented by using hardware. The hardware environment includes a network environment.

According to an embodiment of the present application, a server or a terminal (that is, an electronic apparatus) configured to implement the foregoing method for synchronously displaying game content is further provided.

Figure 10:
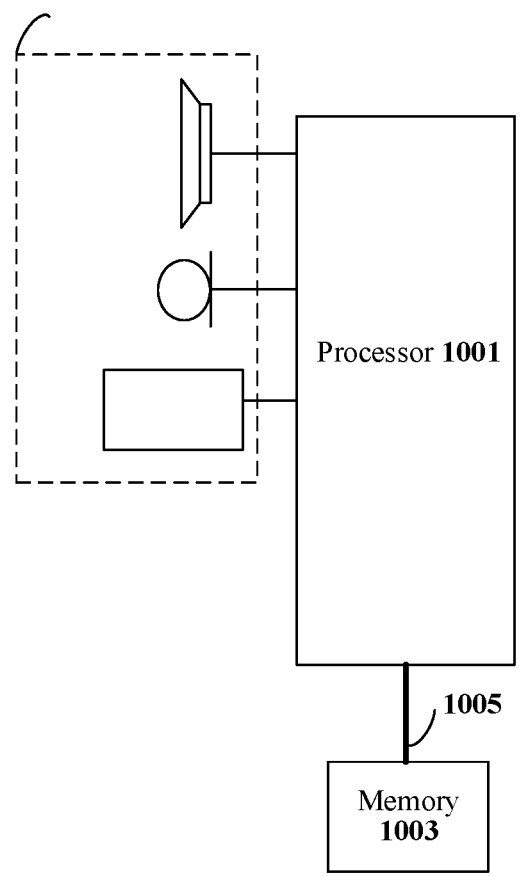
FIG. 10 is a structural block diagram of a terminal according to an embodiment of the present application.

FIG. 10 is structural block diagram of a terminal according to an embodiment of the present application. As shown in FIG. 10, the terminal may include one or more (only one is shown in the figure) processors 1001, a memory 1003, and a transmission apparatus 1005 (for example, a sending apparatus in the foregoing embodiment). As shown in FIG. 10, the terminal may further include an input/output device 1007.

The memory 1003 may be configured to store a software program and a module, for example, a program instruction/module corresponding to the method and apparatus for synchronously displaying game content in the embodiments of the present application. The processor 1001 performs various functional applications and data processing by running a software program and a module stored in the memory 1003, that is, implementing the foregoing method for synchronously displaying game content. The memory 1003 may include a high speed RAM, and may further include a non-volatile memory, for example, one or more magnetic storage apparatuses, a flash memory, or another non-volatile solid-state memory. In some examples, the memory 1003 may further include a memory remotely disposed from the processor 1001. The remote memory may be connected to the terminal through a network. Examples of the network include, but are not limited to, the Internet, an intranet, a local area network, a mobile communications network, and a combination thereof.

The transmission apparatus 1005 is configured to receive or send data by using a network, and may further be configured to transmit data between a processor and a memory. Specific examples of the network include a wired network and a wireless network. In an example, the transmission apparatus 1005 includes a network interface controller (NIC), which may be connected to another network device and router by using a cable, so as to communicate with the Internet or a local area network. In an instance, the transmission apparatus 1005 is a radio frequency (RF)

module, and the RF module is configured to communicate with the Internet in a wireless manner.

Specifically, the memory 1003 is configured to store an application program.

The processor 1001 may invoke the application program stored in the memory 1003 through the transmission device 1005 to perform the following steps: detecting a first operation instruction on a first client of a game application in a case that a round of game of the game application is run on the first client, a first account being logged into on the first client, accounts participating in the round of game including the first account and a second account, and the second account being configured for login on a second client of the game application; controlling the first operation object of the first account in the round of game in response to the first operation instruction to perform the first operation; obtaining locally on the first client first content that needs to be displayed on the first client in a case that the first operation is performed, and obtaining second content to be simultaneously displayed with the first content, the second content being content that needs to be displayed on the second client in a case that a second operation object of the second account in the round of game performs a second operation; and simultaneously displaying the first content and the second content on the first client.

The processor 1001 is further configured to perform the following steps: obtaining first attribute change information delivered by the second client, where the first attribute change information is configured for describing an attribute change caused by the second operation object performing the second operation in the round of game, and the second operation is an operation triggered by a second operation instruction detected on the second client; and determining the second content locally on the first client according to the first attribute change information.

In the embodiments of the present application, when the first client of the game application runs a round of game of the game application, the first operation instruction is detected on the first client, and the first operation object of the first account in the round of game is controlled to perform the first operation. The first client locally obtains the first content that needs to be displayed on the first client in a case that the first operation is performed, and obtains the second content to be simultaneously displayed with the first content, so that the first content of the first account and the second content of the second account in the round of game are simultaneously displayed on the first client. This resolves technical problem that the game content of other operators in the same round of game cannot be locally displayed in the related art, thereby achieving the technical effect of synchronous display of game content.

For a specific example in this embodiment, refer to the examples described in the foregoing method for synchronously displaying game content and the apparatus for synchronously displaying game content. Details are not described in this embodiment.

A person of ordinary skill in the art may understand that, the structure shown in FIG. 10 is only exemplary. The terminal may be a terminal device such as a smartphone (such as an Android phone or an iOS phone), a tablet computer, a palmtop computer, a mobile Internet device (MID), or a PAD. FIG. 10 does not constitute a limitation on the structure of the foregoing electronic apparatus. For example, the terminal may further include more or fewer components (such as a network interface and a display apparatus) than those shown in FIG. 10, or may have a configuration different from that shown in FIG. 10.

A person of ordinary skill in the art may understand that all or some of the steps of the methods in the embodiments may be implemented by a program by instructing hardware relevant to a terminal device. The program may be stored in a computer readable storage medium, and the storage medium may be a flash drive, a ROM, a RAM, a magnetic disk, an optical disc or the like.

An embodiment of the present application further provides a storage medium. In this embodiment, the storage medium may be configured to execute program code of the method for synchronously displaying game content.

In this embodiment, the storage medium may be located in at least one of a plurality of network devices on a network shown in the foregoing embodiments.

In this embodiment, the storage medium is configured to store program code configured for performing the following steps:

S11: Detect a first operation instruction on a first client of a game application in a case that a round of game of the game application is run on the first client, a first account being logged into on the first client, accounts participating in the round of game including the first account and a second account, and the second account being configured for login on a second client of the game application.

S12: Determine, according to the first operation instruction, a first operation that corresponds to the first operation instruction and is performed by a first operation object corresponding to the first account in the round of game.

S13: Determine first content that needs to be displayed on the first client in a case that the first operation object performs the first operation, and obtain second content to be simultaneously displayed with the first content, the second content being content that needs to be displayed on the second client in a case that a second operation object of the second account in the round of game performs a second operation.

S14: Simultaneously display the first content and the second content on the first client.

The storage medium is further configured to store program code configured for performing the following step:

S21: Obtain first attribute change information delivered by the second client, where the first attribute change information is configured for describing an attribute change caused by the second operation object performing the second operation in the round of game, where the second operation is an operation triggered by a second operation instruction detected on the second client.

S22: Determine the second content locally on the first client according to the first attribute change information.

For a specific example in this embodiment, refer to the examples described in the foregoing method for synchronously displaying game content and the apparatus for synchronously displaying game content. Details are not described in this embodiment.

In this embodiment, the storage medium may include, but is not limited to, a medium such as a USB flash drive, a ROM, a RAM, a removable hard disk, a magnetic disk, or an optical disc that can store the program code.

The sequence numbers of the preceding embodiments of the present application are merely for description purpose but do not indicate the preference of the embodiments.

When the integrated unit in the foregoing embodiments is implemented in the form of a software functional unit and sold or used as an independent product, the integrated unit may be stored in the foregoing computer-readable storage medium. Based on such an understanding, the technical solutions of the present application essentially, or the part contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of the steps of the method described in the embodiments of the present application.

In the foregoing embodiments of the present application, the descriptions of the embodiments have respective focuses. For a part that is not described in detail in an embodiment, refer to related descriptions in other embodiments.

In the several embodiments provided in the present application, it is to be understood that the disclosed client may be implemented in other manners. For example, the described apparatus embodiments are merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic, mechanical, or other forms.

The units described as separate parts may or may not be physically separate, and the parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software function unit.

The foregoing descriptions are merely some implementations of the present application, and a person of ordinary skill in the art may further make several improvements and modifications without departing from the principle of the present application. These improvements and modifications are also intended to be considered as falling within the protection scope of the present application.

What is claimed is:

1. A method for synchronously displaying game content performed by a terminal device having one or more processors and memory storing a plurality of programs to be executed by the one or more processors and the method comprising:
   detecting a first operation instruction on a first client of a game application in a case that a round of game of the game application is run on the first client, a first account being logged into on the first client, accounts participating in the round of game comprising the first account and a second account, and the second account being configured for login on a second client of the game application;
   determining, according to the first operation instruction, a first operation that corresponds to the first operation instruction and is performed by a first operation object corresponding to the first account in the round of game;
   determining first content that needs to be displayed on the first client in a case that the first operation object performs the first operation, and obtaining second content to be simultaneously displayed with the first content, the second content being content that needs to be displayed on the second client in a case that a second operation object corresponding to the second account in the round of game performs a second operation;
   simultaneously displaying the first content and the second content on the first client;
   in accordance with a determination that the first client is disconnected:
   obtaining a current progress time of the round of game from the second client;
   determining, in a plurality of reference time marks of the round of game, a target reference time mark that is adjacent to the current progress time and has arrived, wherein the reference time marks are pre-identified moments in the progress time of the round of game; and
   reloading the round of game on the first client, and updating a game picture of the reloaded round of game from a first picture to a second picture, wherein the first picture is a game picture at the target reference time mark in the round of game, and the second picture is a game picture at the current progress time in the round of game.

2. The method according to claim 1, wherein the obtaining second content to be simultaneously displayed with the first content comprises:
   obtaining first attribute change information delivered by the second client, wherein the first attribute change information is configured for describing an attribute change caused by the second operation object performing the second operation in the round of game, and the second operation is an operation triggered by a second operation instruction detected on the second client; and
   determining the second content on the first client according to the first attribute change information,
   wherein the simultaneously displaying the first content and the second content on the first client comprises:
   superimposing the second content determined according to the first attribute change information on a game picture of the first client for display, wherein the game picture of the first client is a picture displaying the first content.

3. The method according to claim 2, wherein the superimposing the second content determined according to the first attribute change information on a game picture of the first client for display comprises:
   displaying the superimposed second content on the game picture of the first client in a second display mode while the first content is displayed on the game picture of the first client in a first display mode, wherein the first display mode is different from the second display mode.

4. The method according to claim 2, wherein the obtaining first attribute change information delivered by the second client comprises:
   receiving, in a data transmission channel, the first attribute change information forwarded by the second client through a synchronization server, wherein the data transmission channel is a channel connected to the synchronization server and transmitting data by using the User Datagram Protocol (UDP).

5. The method according to claim 1, wherein the determining first content that needs to be displayed on the first client in a case that the first operation object performs the first operation comprises at least one of the following:

determining on the first client the first content configured for indicating a position at which the first operation object is located after a position attribute of the first operation object is changed in a case that the first operation is an operation of changing the position attribute of the first operation object; and determining on the first client the first content configured for indicating content related to shooting in a case that the first operation is a shooting operation of the first operation object.

6. The method according to claim 5, wherein after the first content that needs to be displayed on the first client in a case that the first operation is performed is obtained on the first client, the method further comprises:

transmitting second attribute change information to a synchronization server in a data transmission channel, wherein the synchronization server is configured to forward the second attribute change information to the second client, the second attribute change information is information configured for describing a change of the position attribute and/or a change of an attribute related to the shooting operation, and the data transmission channel is a channel connected to the synchronization server and transmitting data by using a User Datagram Protocol (UDP).

7. The method according to claim 1, wherein that the running of a round of game of a game application on the first client of the game application comprises:

running the round of game on the first client according to of instruction information in a case that the instruction information is received on the first client, wherein the instruction information is configured for instructing the first client and the second client to run a round of game and perform events related to a non-player control object at the same moment.

8. The method according to claim 6, wherein before the transmitting second attribute change information to the synchronization server in a data transmission channel, the method further comprises:

preprocessing a plurality of first messages transmitting the attribute change information, wherein the preprocessing comprises generating a second message from the plurality of first messages of the same type, and the second message is configured for representing the plurality of first messages of the same type;

packing all the second messages into a message packet; and compressing the message packet.

9. A terminal device comprising one or more processors, memory coupled to the one or more processors and a plurality of programs stored in the memory that, when executed by the one or more processors, cause the terminal device to perform a plurality of operations comprising:

detecting a first operation instruction on a first client of a game application in a case that a round of game of the game application is run on the first client, a first account being logged into on the first client, accounts participating in the round of game comprising the first account and a second account, and the second account being configured for login on a second client of the game application;

determining, according to the first operation instruction, a first operation that corresponds to the first operation instruction and is performed by a first operation object corresponding to the first account in the round of game;

determining first content that needs to be displayed on the first client in a case that the first operation object performs the first operation, and obtaining second content to be simultaneously displayed with the first content, the second content being content that needs to be displayed on the second client in a case that a second operation object corresponding to the second account in the round of game performs a second operation;

simultaneously displaying the first content and the second content on the first client;

in accordance with a determination that the first client is disconnected:

obtaining a current progress time of the round of game from the second client;

determining, in a plurality of reference time marks of the round of game, a target reference time mark that is adjacent to the current progress time and has arrived, wherein the reference time marks are pre-identified moments in the progress time of the round of game; and reloading the round of game on the first client, and updating a game picture of the reloaded round of game from a first picture to a second picture, wherein the first picture is a game picture at the target reference time mark in the round of game, and the second picture is a game picture at the current progress time in the round of game.

10. The terminal device according to claim 9, wherein the obtaining second content to be simultaneously displayed with the first content comprises:

obtaining first attribute change information delivered by the second client, wherein the first attribute change information is configured for describing an attribute change caused by the second operation object performing the second operation in the round of game, and the second operation is an operation triggered by a second operation instruction detected on the second client; and determining the second content on the first client according to the first attribute change information, wherein the simultaneously displaying the first content and the second content on the first client comprises:

superimposing the second content determined according to the first attribute change information on a game picture of the first client for display, wherein the game picture of the first client is a picture displaying the first content.

11. The terminal device according to claim 10, wherein the superimposing the second content determined according to the first attribute change information on a game picture of the first client for display comprises:

displaying the superimposed second content on the game picture of the first client in a second display mode while the first content is displayed on the game picture of the first client in a first display mode, wherein the first display mode is different from the second display mode.

12. The terminal device according to claim 10, wherein the obtaining first attribute change information delivered by the second client comprises:

receiving, in a data transmission channel, the first attribute change information forwarded by the second client through a synchronization server, wherein the data transmission channel is a channel connected to the synchronization server and transmitting data by using the User Datagram Protocol (UDP).

13. The terminal device according to claim 9, wherein the determining first content that needs to be displayed on the first client in a case that the first operation object performs the first operation comprises at least one of the following:

determining on the first client the first content configured for indicating a position at which the first operation object is located after a position attribute of the first operation object is changed in a case that the first operation is an operation of changing the position attribute of the first operation object; and determining on the first client the first content configured for indicating content related to shooting in a case that the first operation is a shooting operation of the first operation object.

14. The terminal device according to claim 13, wherein the plurality of operations further comprise:

after the first content that needs to be displayed on the first client in a case that the first operation is performed is obtained on the first client:

transmitting second attribute change information to a synchronization server in a data transmission channel, wherein the synchronization server is configured to forward the second attribute change information to the second client, the second attribute change information is information configured for describing a change of the position attribute and/or a change of an attribute related to the shooting operation, and the data transmission channel is a channel connected to the synchronization server and transmitting data by using a User Datagram Protocol (UDP).

15. The terminal device according to claim 9, wherein that the running of a round of game of a game application on the first client of the game application comprises:

running the round of game on the first client according to an instruction of instruction information in a case that the instruction information is received on the first client, wherein the instruction information is configured for instructing the first client and the second client to run a round of game and perform events related to a non-player control object at the same moment.

16. A non-transitory computer readable storage medium storing a plurality of machine readable instructions in connection with a terminal device having one or more processors, wherein the plurality of machine readable instructions, when executed by the one or more processors, cause the terminal device to perform a plurality of operations including:

detecting a first operation instruction on a first client of a game application in a case that a round of game of the game application is run on the first client, a first account being logged into on the first client, accounts participating in the round of game comprising the first account and a second account, and the second account being configured for login on a second client of the game application;

determining, according to the first operation instruction, a first operation that corresponds to the first operation instruction and is performed by a first operation object corresponding to the first account in the round of game;

determining first content that needs to be displayed on the first client in a case that the first operation object performs the first operation, and obtaining second content to be simultaneously displayed with the first content, the second content being content that needs to be displayed on the second client in a case that a second operation object corresponding to the second account in the round of game performs a second operation;

simultaneously displaying the first content and the second content on the first client;

in accordance with a determination that the first client is disconnected:

obtaining a current progress time of the round of game from the second client;

determining, in a plurality of reference time marks of the round of game, a target reference time mark that is adjacent to the current progress time and has arrived, wherein the reference time marks are pre-identified moments in the progress time of the round of game; and reloading the round of game on the first client, and updating a game picture of the reloaded round of game from a first picture to a second picture, wherein the first picture is a game picture at the target reference time mark in the round of game, and the second picture is a game picture at the current progress time in the round of game.

17. The non-transitory computer readable storage medium according to claim 16, wherein the obtaining second content to be simultaneously displayed with the first content comprises:

obtaining first attribute change information delivered by the second client, wherein the first attribute change information is configured for describing an attribute change caused by the second operation object performing the second operation in the round of game, and the second operation is an operation triggered by a second operation instruction detected on the second client; and determining the second content on the first client according to the first attribute change information, wherein the simultaneously displaying the first content and the second content on the first client comprises:

superimposing the second content determined according to the first attribute change information on a game picture of the first client for display, wherein the game picture of the first client is a picture displaying the first content.

18. The non-transitory computer readable storage medium according to claim 17, wherein the superimposing the second content determined according to the first attribute change information on a game picture of the first client for display comprises:

displaying the superimposed second content on the game picture of the first client in a second display mode while the first content is displayed on the game picture of the first client in a first display mode, wherein the first display mode is different from the second display mode.

19. The non-transitory computer readable storage medium according to claim 16, wherein the determining first content that needs to be displayed on the first client in a case that the first operation object performs the first operation comprises at least one of the following:

determining on the first client the first content configured for indicating a position at which the first operation object is located after a position attribute of the first operation object is changed in a case that the first operation is an operation of changing the position attribute of the first operation object; and determining on the first client the first content configured for indicating content related to shooting in a case that the first operation is a shooting operation of the first operation object.

20. The non-transitory computer readable storage medium according to claim 16, wherein that the running of a round of game of a game application on the first client of the game application comprises:

running the round of game on the first client according to an instruction of instruction information in a case that the instruction information is received on the first client, wherein the instruction information is configured for instructing the first client and the second client to run a round of game and perform events related to a non-player control object at the same moment.

* * * * *